(12) United States Patent
Kwon et al.

(10) Patent No.: US 11,721,084 B2
(45) Date of Patent: *Aug. 8, 2023

(54) ELECTRONIC DEVICE AND METHOD FOR CORRECTING IMAGE LATENCY

(71) Applicant: SAMSUNG ELECTRONICS CO., LTD., Suwon-si (KR)

(72) Inventors: Namseop Kwon, Suwon-si (KR); Myungjae Jeon, Yongin-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,712

(22) Filed: Jan. 7, 2022

(65) Prior Publication Data

US 2022/0375196 A1 Nov. 24, 2022

(30) Foreign Application Priority Data

May 18, 2021 (KR) .................. 10-2021-0064220

(51) Int. Cl.
*G06V 10/75* (2022.01)
*G02B 27/01* (2006.01)
(Continued)

(52) U.S. Cl.
CPC ....... *G06V 10/7515* (2022.01); *G02B 27/017* (2013.01); *G02B 27/0179* (2013.01);
(Continued)

(58) Field of Classification Search
CPC .............. G06V 10/7515; G02B 27/017; G02B 27/0179; G02B 2027/0178; G02B 2027/0187; G06T 5/50; G06T 7/55
See application file for complete search history.

(56) References Cited

U.S. PATENT DOCUMENTS 10,242,654 B2   3/2019  Ozguner et al.
10,339,853 B2 * 7/2019  Bang .................... G02B 27/017
(Continued)

FOREIGN PATENT DOCUMENTS

KR   10-2013-0054868 A   5/2013
KR   10-2019-0015093 A   2/2019
(Continued)

OTHER PUBLICATIONS

Wang et al., "Design, tolerance, and fabrication of an optical see-through head-mounted display with free-form surface elements," Applied Optics, vol. 52, No. 7, pp. C88-C99, Mar. 2013.
(Continued)

*Primary Examiner* — Ibrahim A Khan
(74) *Attorney, Agent, or Firm* — Sughrue Mion, PLLC

(57) ABSTRACT

An electronic device includes a communication interface and a processor, wherein the processor receives a first image predistorted and rendered at a first time, from an external device through the communication interface, calculates a pixel shift for each pixel of the received first image at a second time that is different from the first time, generates a second image by reprojecting the first image based on the calculated pixel shift, and transmits the generated second image to the external device through the communication interface.

20 Claims, 11 Drawing Sheets

(51) Int. Cl.
*G06T 7/55* (2017.01)
*G06T 5/50* (2006.01)

(52) U.S. Cl.
CPC ............... *G06T 5/50* (2013.01); *G06T 7/55* (2017.01); *G02B 2027/0178* (2013.01); *G02B 2027/0187* (2013.01)

(56) References Cited

U.S. PATENT DOCUMENTS

| | | | |
|---|---|---|---|
| 10,410,372 B1* | 9/2019 | Bapat | H04N 25/61 |
| 10,453,175 B2 | 10/2019 | Mierle et al. | |
| 10,515,573 B2* | 12/2019 | Hwang | G06F 3/012 |
| 10,572,004 B2* | 2/2020 | Kim | G06F 3/011 |
| 11,011,123 B1* | 5/2021 | Hunt | G09G 3/3618 |
| 11,049,476 B2* | 6/2021 | Fuchs | G09G 5/377 |
| 11,379,948 B2* | 7/2022 | Nourai | G06T 19/006 |
| 2013/0128057 A1 | 5/2013 | Cho et al. | |
| 2014/0210970 A1 | 7/2014 | Dalal et al. | |
| 2015/0029218 A1* | 1/2015 | Williams | G02B 27/0172 345/633 |
| 2015/0310665 A1* | 10/2015 | Michail | G06F 3/013 345/419 |
| 2016/0035108 A1* | 2/2016 | Yu | A61B 5/721 382/131 |
| 2016/0189429 A1 | 6/2016 | Mallinson | |
| 2016/0267717 A1* | 9/2016 | Bar-Zeev | G02B 27/017 |
| 2016/0314564 A1* | 10/2016 | Jones | G06T 5/006 |
| 2017/0018121 A1* | 1/2017 | Lawson | G06V 40/10 |
| 2017/0188013 A1 | 6/2017 | Presler | |
| 2018/0053284 A1* | 2/2018 | Rodriguez | G06T 5/006 |
| 2018/0061121 A1 | 3/2018 | Yeoh et al. | |
| 2018/0165880 A1* | 6/2018 | Overbeck | H04N 19/139 |
| 2018/0196507 A1* | 7/2018 | Kim | G02B 27/0172 |
| 2018/0218661 A1* | 8/2018 | Guenter | G09G 3/006 |
| 2019/0045213 A1 | 2/2019 | Raut et al. | |
| 2019/0208181 A1* | 7/2019 | Rowell | H04N 9/8715 |
| 2019/0260931 A1* | 8/2019 | Rodriguez | H04N 23/65 |
| 2020/0029057 A1 | 1/2020 | Holmes et al. | |
| 2020/0302682 A1* | 9/2020 | Aksoy | G06T 19/006 |
| 2022/0113543 A1 | 4/2022 | Ohba et al. | |
| 2022/0215515 A1* | 7/2022 | Kwon | G09G 5/393 |

FOREIGN PATENT DOCUMENTS

| | | |
|---|---|---|
| KR | 10-2019-0042644 A | 4/2019 |
| WO | 2020/170455 A1 | 8/2020 |

OTHER PUBLICATIONS

Clover, "Apple Working With TSMC on Micro OLED Displays for Upcoming AR Glasses," Feb. 9, 2021, Total 7 pages.
Van Waveren, "The Asynchronous Time Warp for Virtual Reality on Consumer Hardware," VRST '16, Nov. 2016, Total 10 pages, DOI: http://dx.doi.org/10.1145/2993369.2993375.
Aga et al., "Latency Compensation for Optical See-Through Head-Mounted with Scanned Display," SID 2019 DIGEST, Total 4 pages, 2019.
Communication dated Nov. 21, 2022, issued by the European Patent Office in counterpart European Application No. 22162549.4.

* cited by examiner

ELECTRONIC DEVICE AND METHOD FOR CORRECTING IMAGE LATENCY

CROSS-REFERENCE TO RELATED APPLICATION

This application is based on and claims priority under 35 U.S.C. § 119 to Korean Patent Application No. 10-2021-0064220, filed on May 18, 2021, in the Korean Intellectual Property Office, the disclosure of which is incorporated by reference herein in its entirety.

BACKGROUND

1. Field

The disclosure relates to electronic devices and methods for correcting image latency in implementing augmented reality (AR).

2. Description of the Related Art

Augmented reality (AR) refers to a technology for synthesizing a virtual object or virtual information in a real world environment such that it may appear as the virtual object or the virtual information is present in an original environment. AR technology may provide intuitive user experiences such as voice recognition, gaze recognition, and hand gesture recognition and may provide various services in various fields such as education, industry, medical care, and entertainment.

AR may be implemented through a head-mounted display (HMD) device. The HMD device refers to a display device that is mounted on a user's head to present an image directly in front of the user's eyes. When the HMD device is directly mounted on the user's head and the user's movement is detected in real time, the HMD device may implement AR by displaying an image reflecting the user's movement on the display.

SUMMARY

In implementation of the augmented reality (AR), when a user's movement does not match an image displayed on a display, the user's immersion may be disturbed. The parallax between the user's movement and the image displayed on the display may be referred to as motion-to-photon latency, and an image correction method for minimizing this may be required.

An AR device may correct an image by reflecting a user's final pose before displaying a rendered image on a display, and this correction technology may be referred to as time-warping. In related art, time-warping may be performed in the order of a reprojection stage of correcting coordinates in space with respect to a rendered image and a predistortion stage of precorrecting optical distortion that will occur as an image generated through the reprojection is displayed on a display. When time-warping is performed in two stages, the degree of image latency may increase as the amount of calculation and the calculation time thereof increase. Also, because a time-warped final output image may include only about 80% to about 90% of data, compared to an initial rendered image, the data transmission efficiency thereof may decrease.

Additional aspects will be set forth in part in the description which follows and, in part, will be apparent from the description, or may be learned by practice of the presented embodiments.

According to an aspect of the disclosure, there is provided an electronic device including: a communication interface; and a processor configured to: receive, from an external device through the communication interface, a first image predistorted and rendered at a first time, calculate a pixel shift for each pixel of the received first image at a second time different from the first time, generate a second image by reprojecting the first image based on the calculated pixel shift, and transmit the generated second image to the external device through the communication interface.

The electronic device may further include a memory storing at least one lookup table, wherein the processor may be further configured to: receive a data value of the lookup table from the memory, receive image information about an outside environment from the external device and calculate a pose variation from the first time to the second time, and calculate the pixel shift for the each pixel of the first image based on the data value of the lookup table and the pose variation.

The memory may store, in the lookup table, a plurality of data values obtained by linearly approximating a pixel shift of the first image with respect to a pixel shift of an original image of the first image.

The processor may be further configured to: obtain image data for each scan line with respect to the received first image, receive the data value of the lookup table corresponding to the scan line from the memory, and calculate a pixel shift in the scan line based on the data value of the lookup table corresponding to the scan line and the pose variation.

The processor may be further configured to: receive a depth image corresponding to the first image from the external device, and calculate the pixel shift for the each pixel of the first image based on the first image and the depth image.

When a plurality of depth values are detected in a pixel among a plurality of pixels of the second image, the processor may be further configured to determine a smallest depth value among the plurality of depth values as a depth value of the pixel.

The processor may be further configured to: receive a representative depth value of a representative image corresponding to the first image from the external device, and calculate the pixel shift for the each pixel of the first image based on the first image and the representative depth value.

When a pixel value of a first pixel among a plurality of pixels of the second image is 0, the processor may be configured to insert a pixel value of a second pixel arranged adjacent to the first pixel into the first pixel prior to transmission of the second image to the external device.

According to another aspect of the disclosure, there is provided an operation method of an electronic device, the operation method including: receiving a first image predistorted and rendered at a first time, from an external device; calculating a pixel shift for each pixel of the received first image at a second time different from the first time; generating a second image by reprojecting the first image based on the calculated pixel shift; and transmitting the generated second image to the external device.

The operation method may further include: receiving a data value of a lookup table from a memory; receiving image information about an outside environment from the external device and calculating a pose variation from the first time to the second time; and calculating the pixel shift for the each pixel of the first image based on the data value of the lookup table and the pose variation.

The operation method may further include: obtaining image data for each scan line with respect to the received first image; receiving the data value of the lookup table corresponding to the scan line from the memory; and calculating a pixel shift in the scan line based on the data value of the lookup table corresponding to the scan line and the pose variation.

The operation method may further include: receiving a depth image corresponding to the first image from the external device; and calculating the pixel shift for the each pixel of the first image based on the first image and the depth image.

The operation method may further include: when a plurality of depth values are detected in a pixel among a plurality of pixels of the second image, determining a smallest depth value among the plurality of depth values as a depth value of the pixel.

The receiving a representative depth value of a representative image corresponding to the first image from the external device; and calculating the pixel shift for the each pixel of the first image based on the first image and the representative depth value.

The operation method may further include: when a pixel value of a first pixel among a plurality of pixels of the second image is 0, inserting a pixel value of a second pixel arranged adjacent to the first pixel into the first pixel prior to transmission of the second image to the external device.

According to another aspect of the disclosure, there is provided an electronic device including: a renderer; a projector configured to emit light including image data rendered through the renderer; a lens module configured to display the light emitted from the projector; and receives a first image predistorted and rendered at a first time, from the renderer, a processor configured to: receive, from an external device, a first image predistorted and rendered at a first time, from the renderer, calculate a pixel shift for each pixel of the received first image at a second time different from the first time, generate a second image by reprojecting the first image based on the calculated pixel shift, and transmit data about the generated second image to the projector and control light including the data about the second image to be emitted to the lens module through the projector.

The electronic device may further include: a camera configured to obtain image information about an outside environment; and a memory storing at least one lookup table, wherein the processor is further configured to: receive a data value of the lookup table from the memory, receive the image information obtained through the camera and calculate a pose variation from the first time to the second time, and calculate the pixel shift for the each pixel of the first image based on the data value of the lookup table and the pose variation.

The memory may store, in the lookup table, a plurality of data values obtained by linearly approximating a pixel shift of the first image with respect to a pixel shift of an original image of the first image.

The processor may be further configured to: receive a depth image corresponding to the first image from the renderer, and calculate the pixel shift for the each pixel of the first image based on the first image and the depth image.

The processor may be further configured to: receive a representative depth value of a representative image corresponding to the first image from the renderer, and calculate the pixel shift for the each pixel of the first image based on the first image and the representative depth value.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
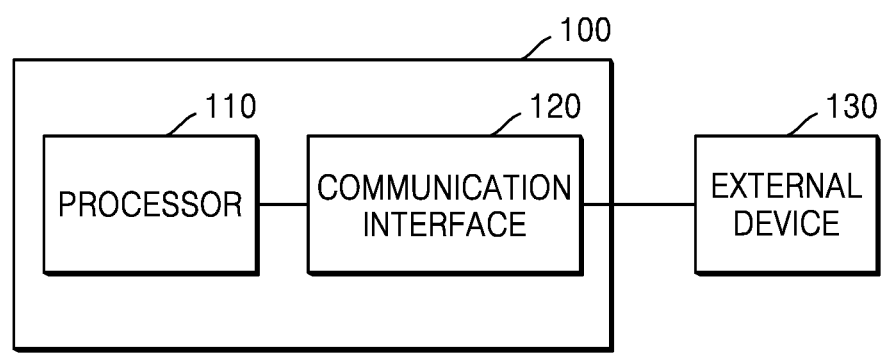
FIG. 1 is a block diagram illustrating components of an electronic device according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the embodiments are those general terms currently widely used in the art, but the terms may vary according to the intentions of those of ordinary skill in the art, precedents, or new technology in the art. Also, in some cases, there may be terms that are optionally selected by the applicant, and the meanings thereof will be described in detail in the corresponding portions of the present disclosure. Thus, the terms used herein should be understood not as simple names but based on the meanings of the terms and the overall description of the present disclosure.

The term such as "comprise" or "include" used herein should not be construed as necessarily including all of the elements or operations described herein, and should be construed as not including some of the described elements or operations or as further including additional elements or operations.

Herein, when an element is referred to as being "connected" to another element, the element may be directly connected to the other element or the element may be electrically connected to the other element with one or more other elements therebetween.

Also, although terms including ordinals such as "first" and "second" may be used herein to describe various elements, these elements should not be limited by these terms. These terms are merely used to distinguish one element from other elements.

Embodiments will be described below in detail with reference to the accompanying drawings. However, the present disclosure may be embodied in many different forms and should not be construed as being limited to the embodiments set forth herein.

FIG. 1 is a block diagram illustrating components of an electronic device according to an example embodiment.

Referring to FIG. 1, an electronic device 100 may include a processor 110 and a communication interface 120. The electronic device 100 may be connected and communicate with an external device 130 through the communication interface 120. For example, the electronic device 100 may be a device that corrects image latency. The external device 130 may be a device that processes a graphic operation. The external device 130 may include a graphic operator including a graphics processing unit (GPU) and may include an electronic circuit including a GPU.

In an example embodiment, the communication interface 120 may support establishment of a wired or wireless communication channel between the electronic device 100 and the external device 130 and performance of communication through the established communication channel. In an embodiment, the communication interface 120 may include a wireless communication interface (e.g., a cellular communication interface, a short-range wireless communication interface, or a global navigation satellite system (GNSS) communication interface) or a wired communication interface. In an embodiment, the electronic device 100 may communicate with the external device 130 through a network by using the communication interface 120. For example, the electronic device 100 may communicate with the external device 130 through a short-range communication network such as Bluetooth, WiFi direct, or Infrared Data Association (IrDA). As another example, the electronic device 100 may communicate with the external device 130 through a telecommunication network such as a cellular network, the Internet, or a computer network (e.g., a local area network (LAN) or a wide area network (WAN)). According to an example embodiment, the communication interface 120 may include electronic components and circuitry configured to facilitate communication.

In an example embodiment, the processor 110 may include a GPU. For example, the processor 110 may perform a graphic processing operation on an image received from the external device 130 connected through the communication interface 120. In an example embodiment, the processor 110 may be included as a portion of an electronic circuit including a field programmable gate array (FPGA).

In an example embodiment, the processor 110 may control at least one other component (e.g., a hardware or software component) of the electronic device 100 connected to the processor 110 by driving software (e.g., a program) and may perform various data processing and operations. In an example embodiment, the processor 110 may load a command or data received from another component into a volatile memory, process the same, and store the result data thereof in a nonvolatile memory.

In an example embodiment, the processor 110 may receive an input image predistorted and rendered from the external device 130 through the communication interface 120. For example, the input image may refer to an image predistorted in a barrel distortion method and rendered. The barrel distortion method may be a method of distortion in the form of a straight line at a center portion of an image and in the form of a curve convexed outward toward an edge portion thereof.

In an example embodiment, the processor 110 may generate a reprojected output image by calculating a pixel shift for each pixel of the predistorted and rendered input image. For example, the reprojected output image may refer to an image displaced by reflecting the coordinate displacement (e.g., displacement due to movement or rotation) of a plurality of pixels with respect to a predistorted input image.

Figure 2:
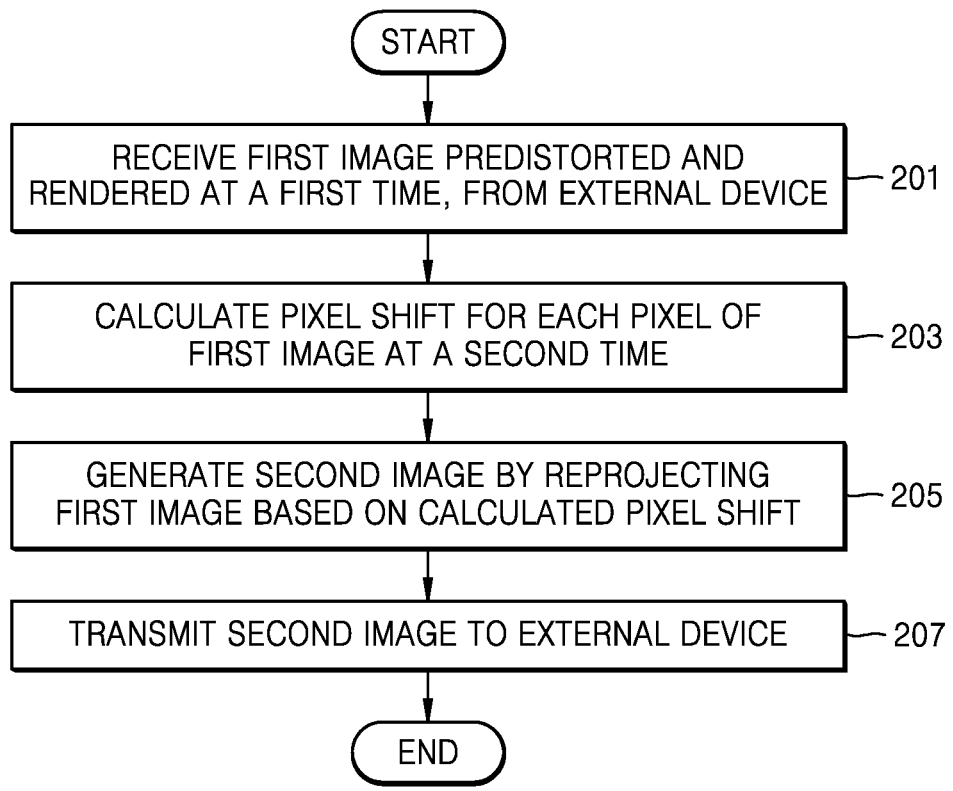
FIG. 2 is a flowchart illustrating that an electronic device corrects image latency, according to an example embodiment.

FIG. 2 is a flowchart illustrating that an electronic device corrects image latency, according to an example embodiment.

Referring to FIG. 2, in operation 201, a processor (e.g., the processor 110 of FIG. 1) may receive a first image predistorted and rendered at a first time, from an external device (e.g., the external device 130 of FIG. 1). For example, the external device 130 may include a renderer that performs rendering to display a virtual object on a display of augmented reality (AR) glasses. In this case, the external device 130 may be controlled through execution of an application related to AR.

In an example embodiment, the processor 110 may receive data related to the first image at the time of receiving the first image from the external device 130. For example, the data related to the first image may include data about the first time rendered by the external device 130 and pose-related data (e.g., $P_{render}$) at the first time.

In an example embodiment, the predistorted first image may be an image to which a specific distortion correction rate has been applied at the time of rendering. The specific distortion rate may be preset or predetermined. In this case, the preset distortion correction rate may be set based on the optical characteristics of a lens mounted on the AR glasses. For example, the preset distortion correction rate may represent the degree of opposite distortion (e.g., barrel distortion) set to correct the degree of distortion (e.g., pincushion distortion) that will occur according to the magnification of the lens mounted on the AR glasses.

In an example embodiment, predistortion may be applied to correct optical distortion occurring in the display of the AR glasses. For example, when an image to which predistortion is not applied is displayed on the display (or lens) of the AR glasses, the image may be distorted in a pincushion distortion method and displayed on the display.

According to an example embodiment, in operation 203, the electronic device 100 may calculate a pixel shift for each pixel of the first image at a second time that is different from the first time. For example, the pixel shift may represent a degree to which a coordinate value of a particular pixel of the first image is shifted from the first time to the second time. A method of calculating the pixel shift for each pixel of the first image will be described below in detail with reference to FIGS. 3 and 4.

According to an example embodiment, in operation 205, the electronic device 100 may generate a second image by reprojecting the first image based on the calculated pixel shift. For example, the second image may refer to an output image corrected by reflecting the calculated pixel shift with respect to the first image received from the external device 130.

According to an example embodiment, in operation 207, the electronic device 100 may transmit the second image to the external device 130. For example, the external device 130 may receive the second image and display the same on the display of the AR glasses. In this case, because distortion aberration may be corrected as optical distortion (e.g., pincushion distortion) occurs with respect to the predistorted (e.g., barrel distortion) first image, the second image may be displayed on the display as a normal image without distortion aberration.

Figure 3:
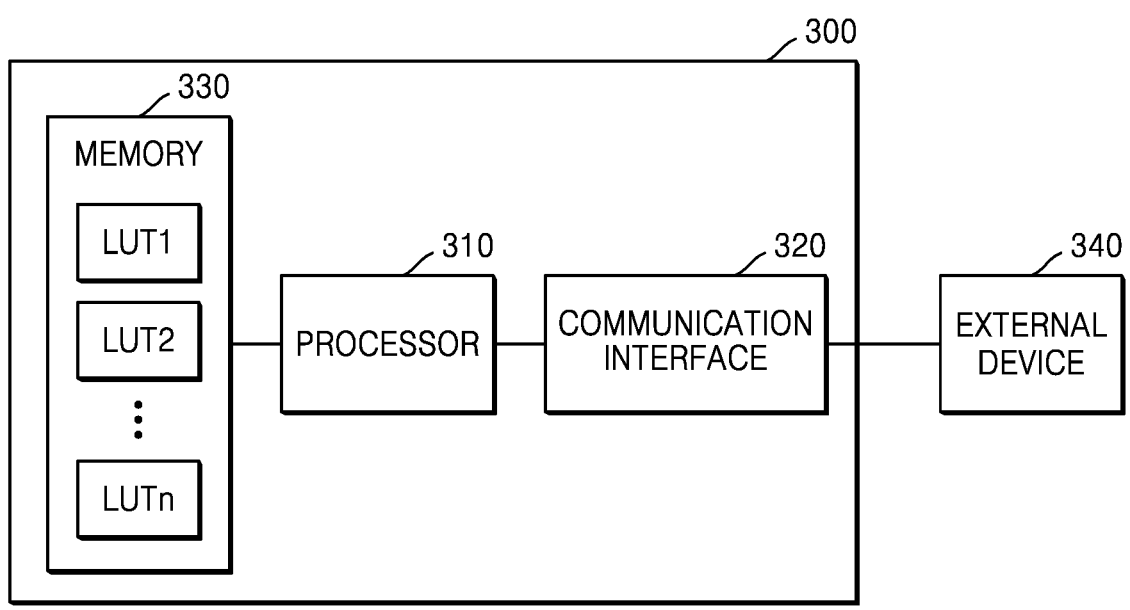
FIG. 3 is a block diagram illustrating components of an electronic device according to an example embodiment.

FIG. 3 is a block diagram illustrating components of an electronic device according to an example embodiment.

Referring to FIG. 3, an electronic device 300 may include a processor 310, a communication interface 320, and a memory 330. Because the processor 310 and the communication interface 320 of FIG. 3 may respectively correspond to the processor 110 and the communication interface 120 of FIG. 1, redundant descriptions thereof may be omitted for conciseness.

In an example embodiment, the memory 330 may store various data used by at least one component (e.g., the processor 310) of the electronic device 300. In an example embodiment, the memory 330 may include a volatile memory or a nonvolatile memory.

In an example embodiment, the memory 330 may store at least one lookup table. In an example embodiment, the memory 330 may store a data value about the relationship between a predistorted first image and an original image of the first image in the form of a lookup table. For example, the memory 330 may store a plurality of data values obtained by linearly approximating a pixel shift of the predistorted first image with respect to a pixel shift of the original image of the first image, in the form of a lookup table. When the pixel coordinates of the predistorted first image are set to [u', v'] and the pixel coordinates of the original image of the first image are set to [u, v], the processor 310 may calculate a pixel shift [du', dv'] of the first image through Equation 1.

$$\begin{bmatrix} du' \\ dv' \end{bmatrix} = \begin{bmatrix} du'/du & du'/dv \\ dv'/du & dv'/dv \end{bmatrix} \begin{bmatrix} du \\ dv \end{bmatrix} \quad [\text{Equation 1}]$$

Also, the processor 310 may calculate a pixel shift [du, dv] of the original image of the first image through Equation 2.

In an example embodiment, the memory 330 may store a data value corresponding to a constant in Equation 1 in the form of LUT 1 and store a data value corresponding to a constant in Equation 2 in the form of LUT 2. For example, the memory 330 may store values of du'/du, du'/dv, dv'/du, and dv'/dv, which are constant values among the data values in Equation 1, in the form of LUT 1. As another example, the memory 330 may store values of $u-c_x$ and $v-c_y$, which are constants among the data values in Equation 2, in the form of LUT 2. However, this is merely an example, and the form in which data is stored in the memory 330 or the type of data stored in the memory 330 is not limited thereto.

In an example embodiment, the processor 310 may receive image information about the outside from an external device 340 through the communication interface 320 and calculate a pose variation thereof. For example, the processor 310 may receive, from the external device 340, the image information obtained through a camera interface of the external device 340. The processor 310 may calculate a pose variation (or a variation of about 6 degrees of freedom (DoF)) from a first time to a second time based on the image information received from the external device 340. In this case, the first time may refer to the time at which the first image is rendered by the external device 340, and the second time may refer to the time at which a pixel shift for each pixel of the first image is calculated by the processor 310.

In an example embodiment, the pose variation may be determined according to a plurality of parameter values. For example, a plurality of parameters about the pose variation may include $dt_x$, $dt_y$, $dt_z$, $d\theta_x$, $d\theta_y$, and $d\theta_z$. Among the plurality of parameters, $dt_x$, $dt_y$, and $dt_z$ may represent the displacement about the position from the first time to the second time, and $d\theta_x$, $d\theta_y$, and $d\theta_z$ may represent the displacement about the rotation from the first time to the second time.

In an example embodiment, the processor 310 may calculate a pose variation by applying a simultaneous localization and mapping algorithm (SLAM) to the image information obtained through the camera interface of the external device 340. In other embodiments, the processor 310 may calculate a pose variation based on the image information obtained through the camera of the external device 340 and the data obtained through a sensor (e.g., an IMU sensor) of the external device 340.

In an example embodiment, the processor 310 may calculate the pixel shift [du', dv'] of the first image based on the data value of the lookup table stored in the memory 330 and the calculated pose variation. For example, the processor 310 may calculate the pixel shift [du, dv] of the original image of the first image by inserting the data value (e.g., $u-c_x$ and $v-c_y$) stored in the memory 330 and the calculated pose

[Equation 2]

$$\begin{bmatrix} du \\ dv \end{bmatrix} = \begin{vmatrix} \dfrac{f_u}{P_z} & 0 & -\dfrac{u-c_x}{P_z} & -\dfrac{(u-c_x)(v-c_y)}{f_v} & f_u\left(1+\dfrac{(u-c_x)^2}{f_u^2}\right) & -f_u\dfrac{v-c_y}{f_v} \\ 0 & \dfrac{f_v}{P_z} & -\dfrac{v-c_y}{P_z} & -f_v\left(1+\dfrac{(v-c_y)^2}{f_v^2}\right) & \dfrac{(u-c_x)(v-c_y)}{f_u} & -f_v\dfrac{u-c_x}{f_u} \end{vmatrix} \begin{vmatrix} dt_x \\ dt_y \\ dt_z \\ d\theta_x \\ d\theta_y \\ d\theta_z \end{vmatrix}$$

variation ($dt_x$, $dt_y$, $dt_z$, $d\theta_x$, $d\theta_y$, and $d\theta_z$) into Equation 2. The processor 310 may calculate the pixel shift [du', dv'] of the first image by inserting the data value (e.g., du'/du, du'/dv, dv'/du, and dv'/dv) stored in the memory 330 and the calculated pixel shift [du, dv] into Equation 1.

Figure 4:
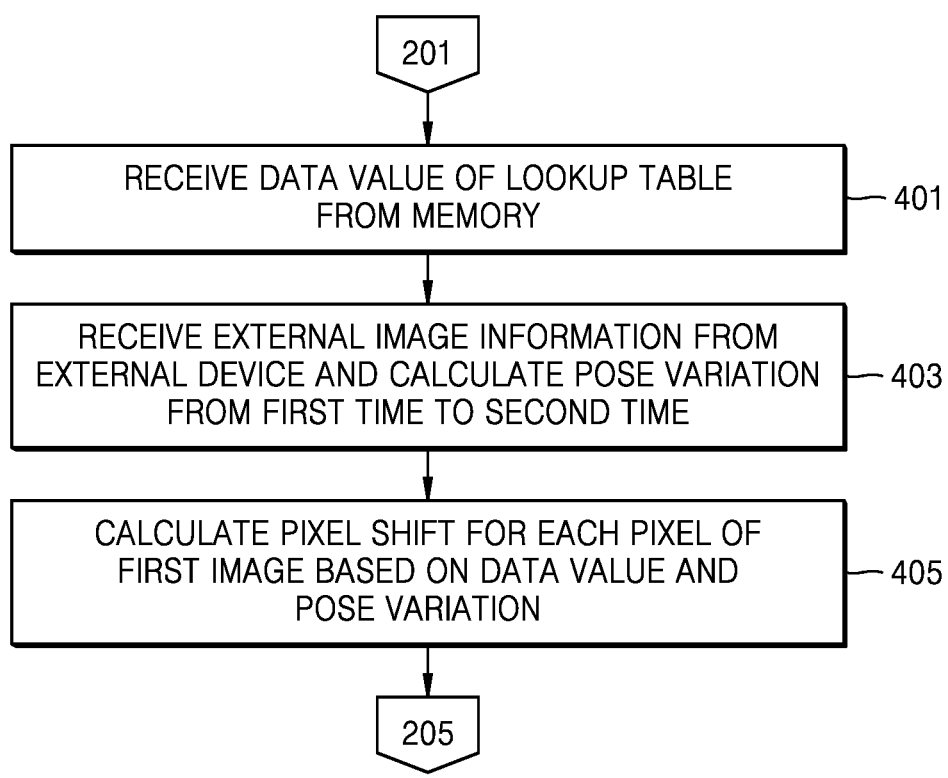
FIG. 4 is a flowchart illustrating that an electronic device performs shift calculation, according to an example embodiment.

FIG. 4 is a flowchart illustrating that an electronic device performs shift calculation, according to an example embodiment. In the description of FIG. 4, descriptions that are substantially the same as those given above may be omitted for conciseness.

Referring to FIG. 4, in operation 401, a processor (e.g., the processor 310 of FIG. 3) may receive a data value of a lookup table from a memory (e.g., the memory 330 of FIG. 3). In an example embodiment, the processor 310 may receive, from the memory 330, a constant value for calculating a pixel shift (e.g., [du', dv']) of the first image based on a pixel shift (e.g., [du, dv]) of an original image of the predistorted first image. For example, the processor 310 may receive LUT 1 about values of du'/du, du'/dv, dv'/du, and dv'/dv and LUT 2 about values of u-$c_x$ and v-$c_y$ among a plurality of lookup tables stored in the memory 330.

According to an example embodiment, in operation 403, the processor 310 may receive external image information from an external device (e.g., the external device 340 of FIG. 3) and calculate a pose variation from the first time to the second time. For example, the processor 310 may obtain values of a plurality of parameters $dt_x$, $dt_y$, $dt_z$, $d\theta_x$, $d\theta_y$, and $d\theta_z$ about the pose variation based on the received external image information. When the external device 340 moves by 3 mm in the +x direction and rotates by 8.1 mrad in the +β direction, the processor 310 may obtain a value of (3 mm, 0, 0, 0, 8.1 mrad, 0) with respect to a plurality of parameters about the pose variation.

In an example embodiment, the processor 310 may calculate a pose variation by applying an SLAM algorithm to the external image information obtained through a camera of an external device (e.g., the external device 340 of FIG. 3). In other embodiments, the processor 310 may calculate a pose variation through the external image information obtained through the camera of the external device 340 and the data obtained through a sensor (e.g., an IMU sensor) of the external device 340.

According to an example embodiment, in operation 405, the processor 310 may calculate a pixel shift for each pixel of the first image based on the data value of the lookup table and the pose variation. For example, the processor 310 may perform calculation by inserting the values of du'/du, du'/dv, dv'/du, and dv'/dv of LUT 1, the values of u-$c_x$ and v-$c_y$ of LUT 2, and the pose variation (e.g., the values of $dt_x$, $dt_y$, $dt_z$, $d\theta_x$, $d\theta_y$, and $d\theta_z$) into Equation 1 and Equation 2. A pixel shift [du', dv'] of the first image obtained through this calculation may be calculated.

Figure 5:
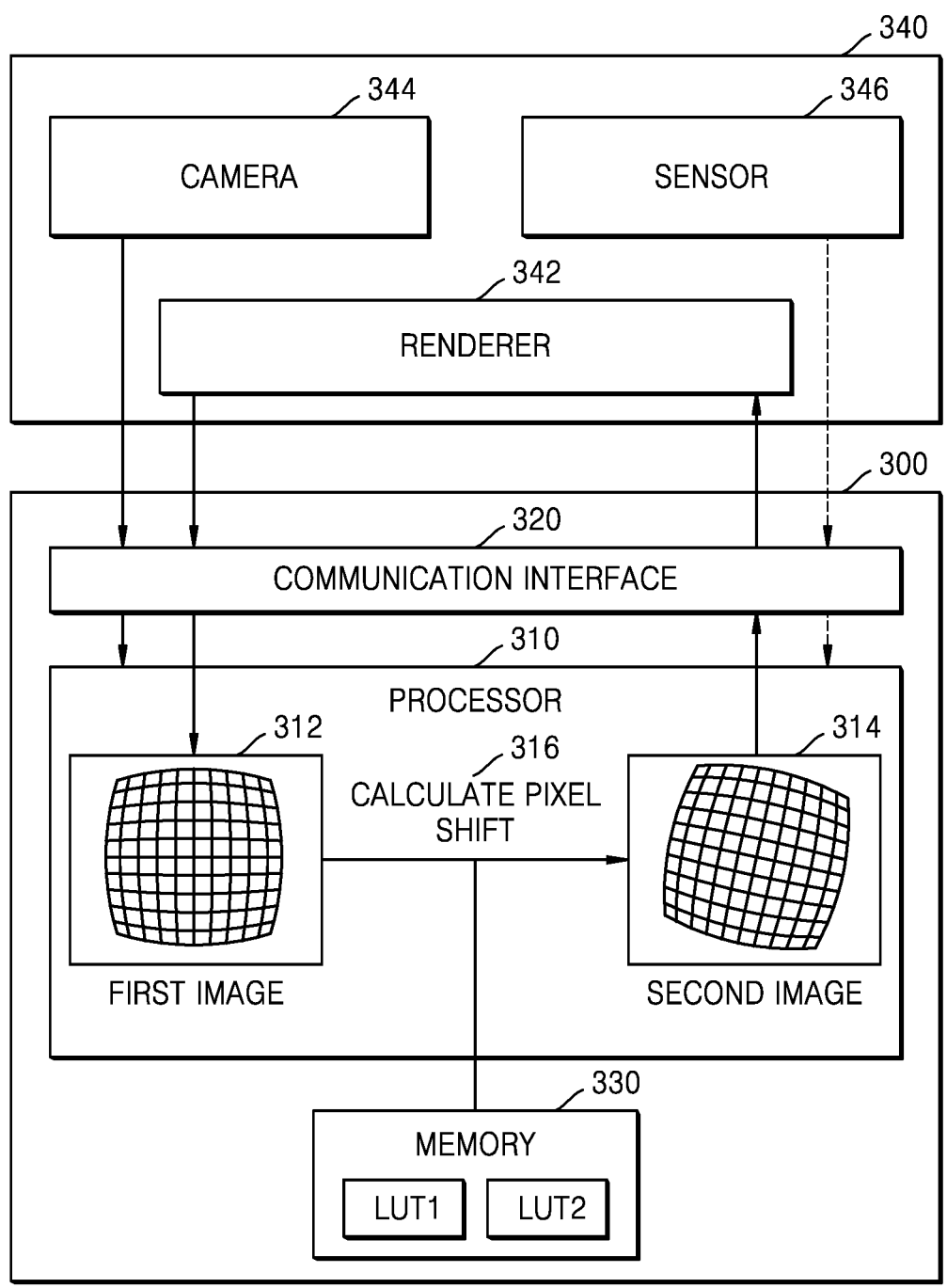
FIG. 5 is a diagram illustrating a method of calculating, by a component of an electronic device, a pixel shift, according to an example embodiment.

FIG. 5 is a diagram illustrating a method of calculating, by a component of an electronic device, a pixel shift, according to an example embodiment.

Referring to FIG. 5, the electronic device 300 may include a processor 310, a communication interface 320, and a memory 330, and the external device 340 may include a renderer 342, a camera 344, and a sensor 346. However, although FIG. 5 illustrates that the electronic device 300 and the external device 340 are physically separated from each other, the relationship between the electronic device 300 and the external device 340 is not limited thereto. For example, when the electronic device 300 is a hardware component (e.g., a chip) for correcting image latency, the electronic device 300 may be included in the external device 340.

In an example embodiment, the processor 310 may receive a first image 312 from the external device 340 through the communication module 320. The first image 312 may refer to an image predistorted and rendered at the first time by the renderer 342. For example, the first image 312 may be an image to which a preset distortion correction rate is applied while rendering is performed at the first time by the renderer 342.

In an example embodiment, the renderer 342 may transmit data about the first time, which is the rendering time, and pose-related data (e.g., $P_{render}$) at the first time together while transmitting the first image 312 predistorted and rendered at the first time.

In an example embodiment, the processor 310 may receive image information about the outside from the external device 340. For example, the processor 310 may receive image information about the surrounding environment obtained through the camera 344 of the external device 340. In an embodiment, the processor 310 may calculate a pose variation based on the image information about the outside. For example, the processor 310 may extract a feature point for the image information about the outside through an SLAM algorithm and obtain pose-related data at the second time (e.g., $P_{latest}$) based on the extracted feature point. The processor 310 may calculate a pose variation based on the pose-related data at the first time and the second time.

In an embodiment, the processor 310 may receive sensing data from the external device 340. For example, the processor 310 may receive sensing data obtained through the sensor 346 (e.g., an IMU sensor). In an embodiment, the processor 310 may obtain pose-related data (e.g., $P_{latest}$) at the second time based on the image information about the outside and the sensing data. The processor 310 may calculate a pose variation based on the pose-related data at the first time and the second time.

In an example embodiment, the processor 310 may calculate (316) a pixel shift for each pixel of the first image 312 based on the pose variation and the data value of the lookup table (e.g., LUT 1 or LUT 2) received from the memory 330. The pixel shift for each pixel of the first image 312 may represent a shift value from the first time at which the first image is rendered by the renderer 342 to the second time at which the pixel shift is calculated.

In an example embodiment, the processor 310 may generate a second image 314 by reprojecting the first image 312 based on the pixel shift of the first image 312. For example, the second image 314 may refer to an image corrected by reflecting the pixel shift from the first time to the second time with respect to the predistorted image. In an example embodiment, the processor 310 may transmit the second image 314 to the external device 340 through the communication module 320.

Figure 6A:
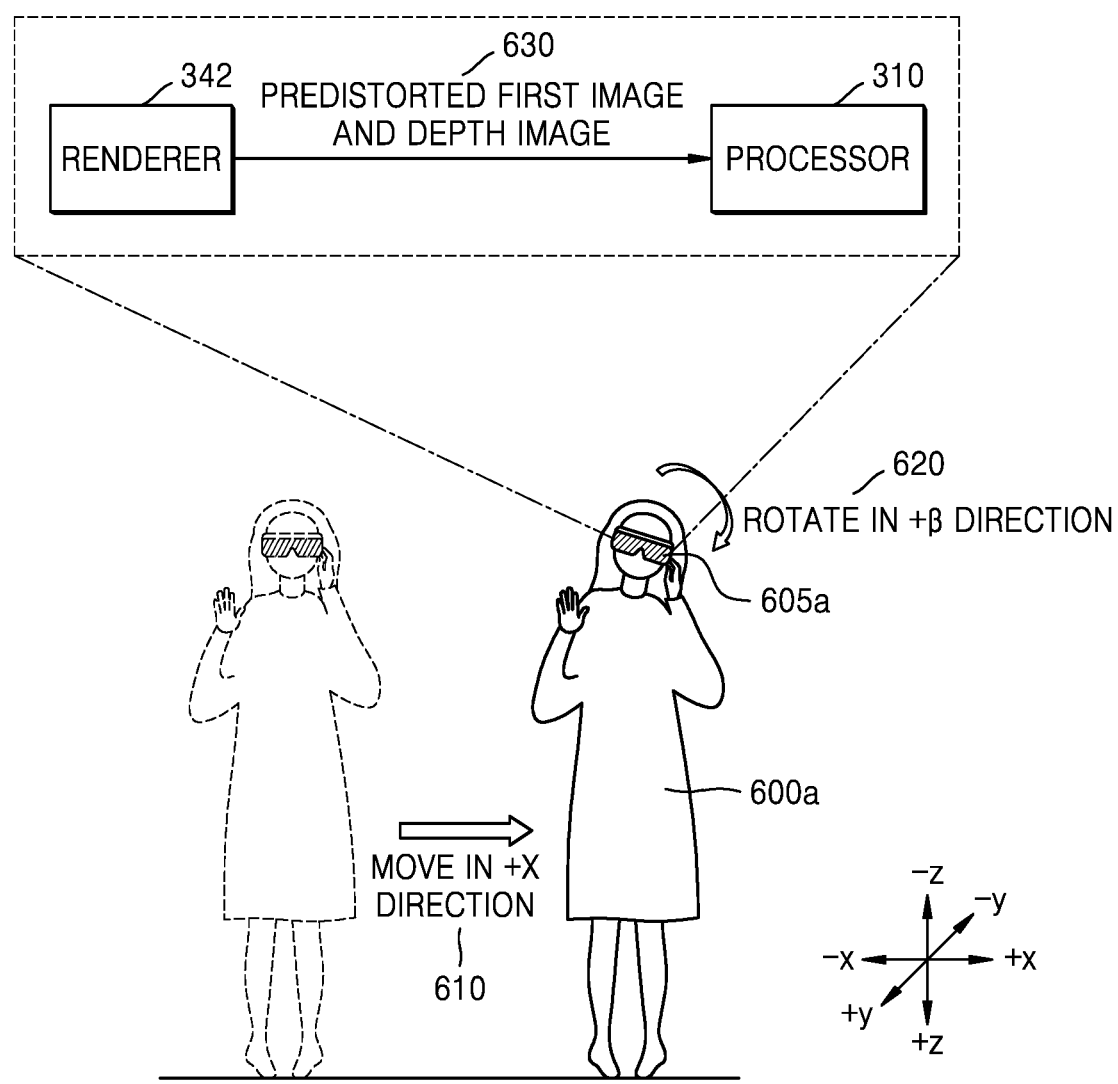
FIG. 6A is a diagram illustrating data transmitted/received by an electronic device according to a user's first movement, according to an example embodiment.
Figure 6B:
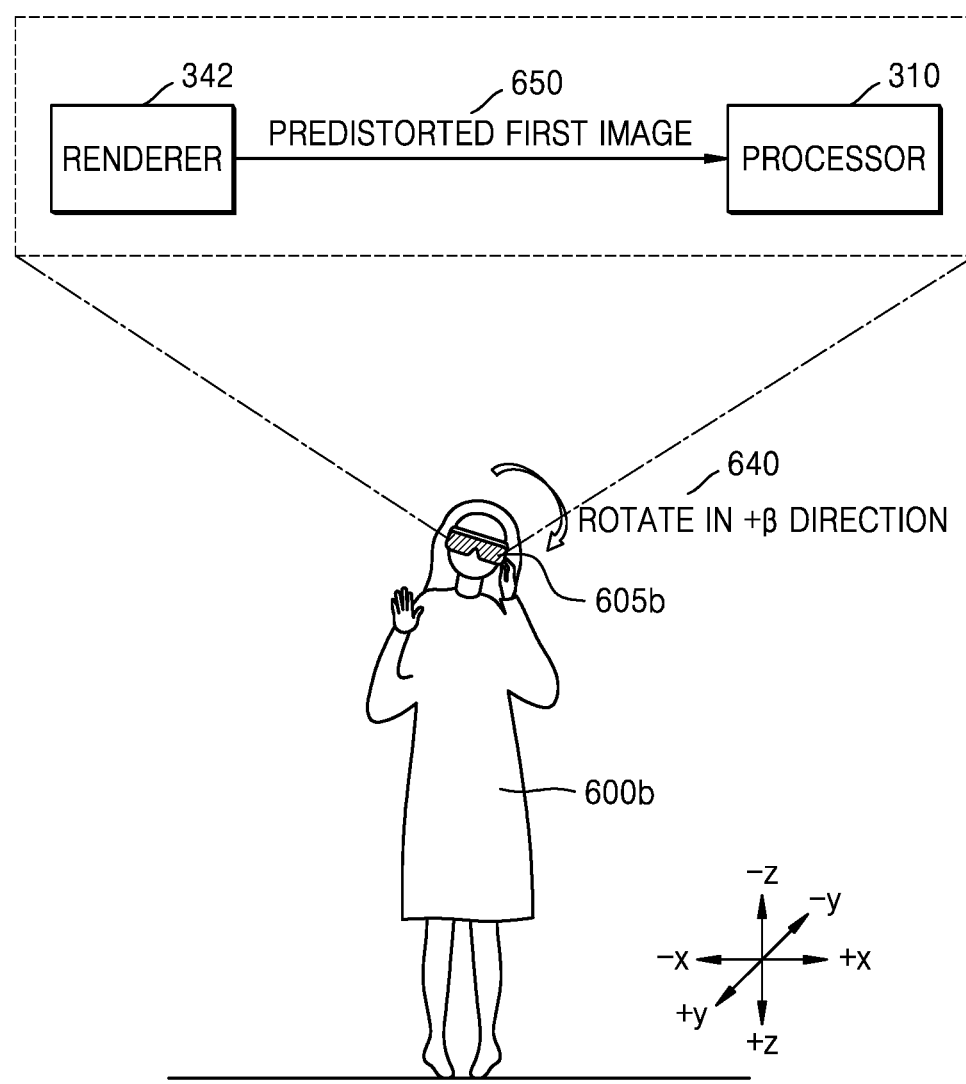
FIG. 6B is a diagram illustrating data transmitted/received by an electronic device according to a user's second movement, according to an example embodiment.

FIG. 6A is a diagram illustrating data transmitted/received by an electronic device according to a user's first movement, according to an example embodiment. FIG. 6B is a diagram illustrating data transmitted/received by an electronic device according to a user's second movement, according to an example embodiment.

Referring to FIG. 6A, when a displacement about position and rotation occurs in AR glasses 605a by a user 600a wearing the AR glasses 605a, the processor 310 may receive a predistorted first image and a depth image 630 from the renderer 342. For example, when the user 600a moves (610) in the +x direction and rotates (620) in the +β direction, the processor 310 may receive the predistorted first image and a depth image corresponding to the first image from the renderer 342.

In an example embodiment, when receiving the predistorted first image and the depth image 630 from the renderer 342, the processor 310 may calculate a pixel shift for each pixel of the first image based on the first image and the depth image.

In an example embodiment, the processor 310 may generate a second image based on the pixel shift calculated based on the first image and the depth image. In this case, when a plurality of depth values are detected in a pixel among a plurality of pixels of the second image, the processor 310 may determine the smallest depth value among the plurality of depth values as a depth value of the pixel. For example, the second image may be a three-dimensional image including a plurality of objects having different distances from the user (e.g., a 'desk' object close to the user and a 'chair' object distant from the user). In this case, the processor 310 may detect respective depth values (e.g., a depth value corresponding to the 'desk' object and a depth value corresponding to the 'chair' object) of a plurality of objects in a particular pixel of the second image. The processor 310 may compare the respective depth values of a plurality of objects with respect to a particular pixel and then determine the smallest depth value as a depth value of the pixel. That is, because the depth value of the 'desk' object located close to the user 600a is less than the depth value of the 'chair' object located distant from the user 600a, the processor 310 may determine the depth value of the 'desk' object as the depth value of a particular pixel.

In an example embodiment, when a pixel value of a first pixel among a plurality of pixels of the second image is 0, the processor 310 may insert a pixel value of a second pixel arranged adjacent to the first pixel into the first pixel. For example, the pixel value of a particular pixel may be omitted in the process of reprojecting the first image. With respect to a particular pixel of which the pixel value is omitted, the processor 310 may insert the pixel value of a pixel arranged adjacent thereto.

Although 6A illustrates only an embodiment in which a depth image is received from the renderer 342 when a displacement about position and rotation occurs in the AR glasses 605a by the user 600a, the disclosure is not limited thereto. In other example embodiments, when a displacement about position and rotation occurs by the user 600a wearing the AR glasses 605a, the processor 310 may receive a predistorted first image and a representative depth value of a depth image from the renderer 342. That is, when receiving the predistorted first image and the representation depth value of the depth image from the renderer 342, the processor 310 may calculate a pixel shift for each pixel of the first image based on the first image and the representative depth value.

Referring to FIG. 6B, when only a rotational displacement occurs in the AR glasses 605a by a user 600b wearing the AR glasses 605b, the processor 310 may receive only a predistorted first image 650 from the renderer 342. For example, when the user 600b rotates (640) in the +β direction, the processor 310 may receive only a predistorted first image from the renderer 342.

In an example embodiment, when receiving only the predistorted first image 650 from the renderer 342, the processor 310 may calculate a pixel shift for each pixel of the first image based on the first image.

When a displacement about position does not occur by the user wearing the AR glasses, the value of $dt_x$, $dt_y$, and $dt_z$ that are a plurality of parameters $dt_x$, $dt_y$, $dt_z$, $d\theta_x$, $d\theta_y$, and $d\theta_z$ about the pose variation may be 0. When the value of $dt_x$, $dt_y$, and $dt_z$ is 0, the processor 310 may not need to receive separate data about a depth value Pz in the matrix multiplication of Equation 2. Thus, when only a rotational displacement occurs in the AR glasses, the processor 310 may receive only a predistorted first image from the renderer 342.

Figure 7:
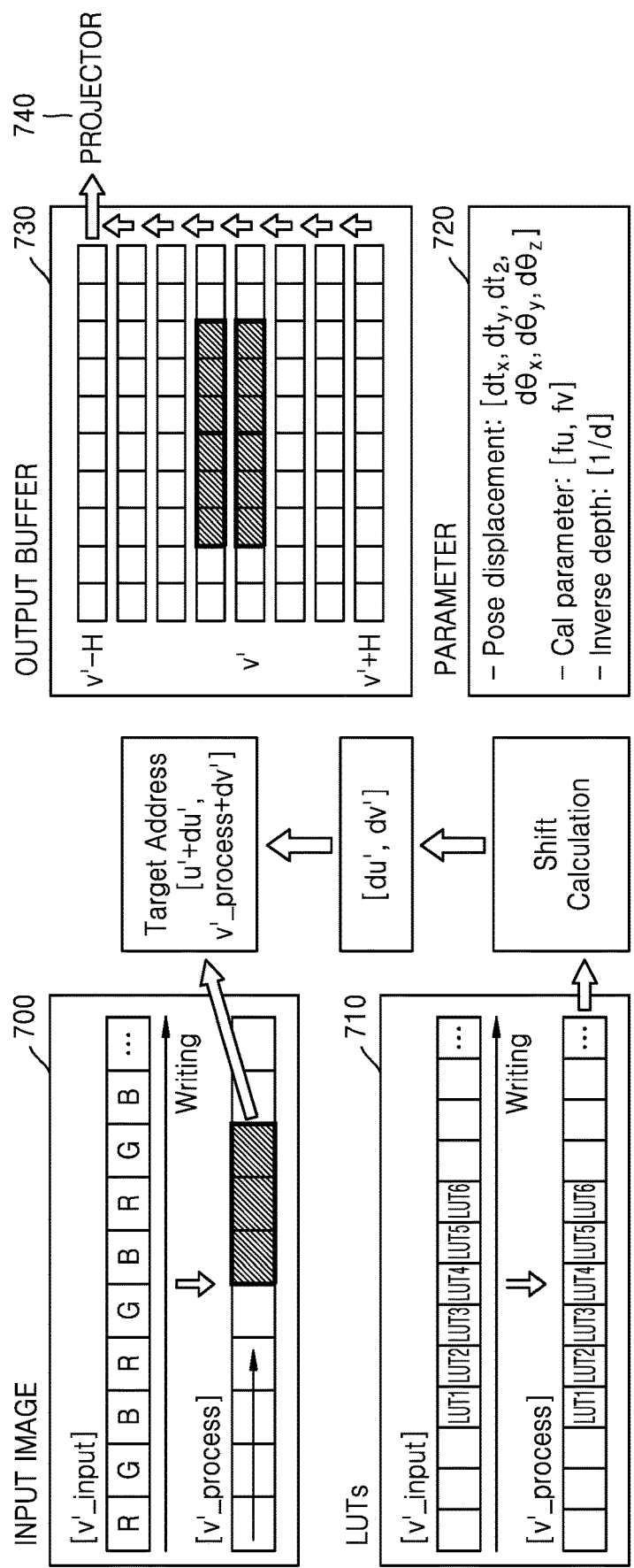
FIG. 7 is a diagram illustrating a method of calculating, by an electronic device, a pixel shift for each scan line, according to an example embodiment.

FIG. 7 is a diagram illustrating a method of calculating, by an electronic device, a pixel shift for each scan line, according to an embodiment.

Referring to FIG. 7, a processor (e.g., the processor 310 of FIG. 3) may generate an output image through an input image 700, a plurality of lookup tables 710, and a parameter 720 and store the output image in an output buffer 730.

In an example embodiment, the processor 310 may obtain image data for each scan line with respect to the input image 700 received from an external device (e.g., the external device 340 of FIG. 3). For example, the input image 700 may include a plurality of pixels in the form of a plurality of rows and columns. The processor 310 may set an individual row as a line in the input image 700 and obtain image data for each scan line.

In an example embodiment, the processor 310 may receive a plurality of lookup tables 710 from a memory (e.g., the memory 330 of FIG. 3) in order to obtain a data value corresponding to the image data for each scan line. In an embodiment, the processor 310 may perform shift calculation based on the parameter 720 and the data value of the plurality of lookup tables 710. In this case, the shift calculation may refer to calculation of a pixel shift in the scan line of the input image 700. In an embodiment, the parameter 720 may include a parameter (e.g., $dt_x$, $dt_y$, $dt_z$, $d\theta_x$, $d\theta_y$, and $d\theta_z$) according to the user's movement and a parameter (e.g., fu, fv, and 1/d) about the unique characteristic of the lens.

In an example embodiment, the processor 310 may obtain a pixel shift [du', dv'] of the predistorted input image 700 by performing shift calculation (e.g., Equation 2). In an example embodiment, the processor 310 may apply a pixel shift [du', dv'] to the image data obtained for each scan line. In an example embodiment, the processor 310 may register a pixel value of a target address based on the pixel shift [du', dv'] of the input image 700.

In an example embodiment, the processor 310 may generate an output image by sequentially calculating scan lines and registering pixel values for a plurality of target points. In an embodiment, the processor 310 may store the generated output image in the output buffer 730, scan each row, and transmit the same to a projector 740.

Figure 8:
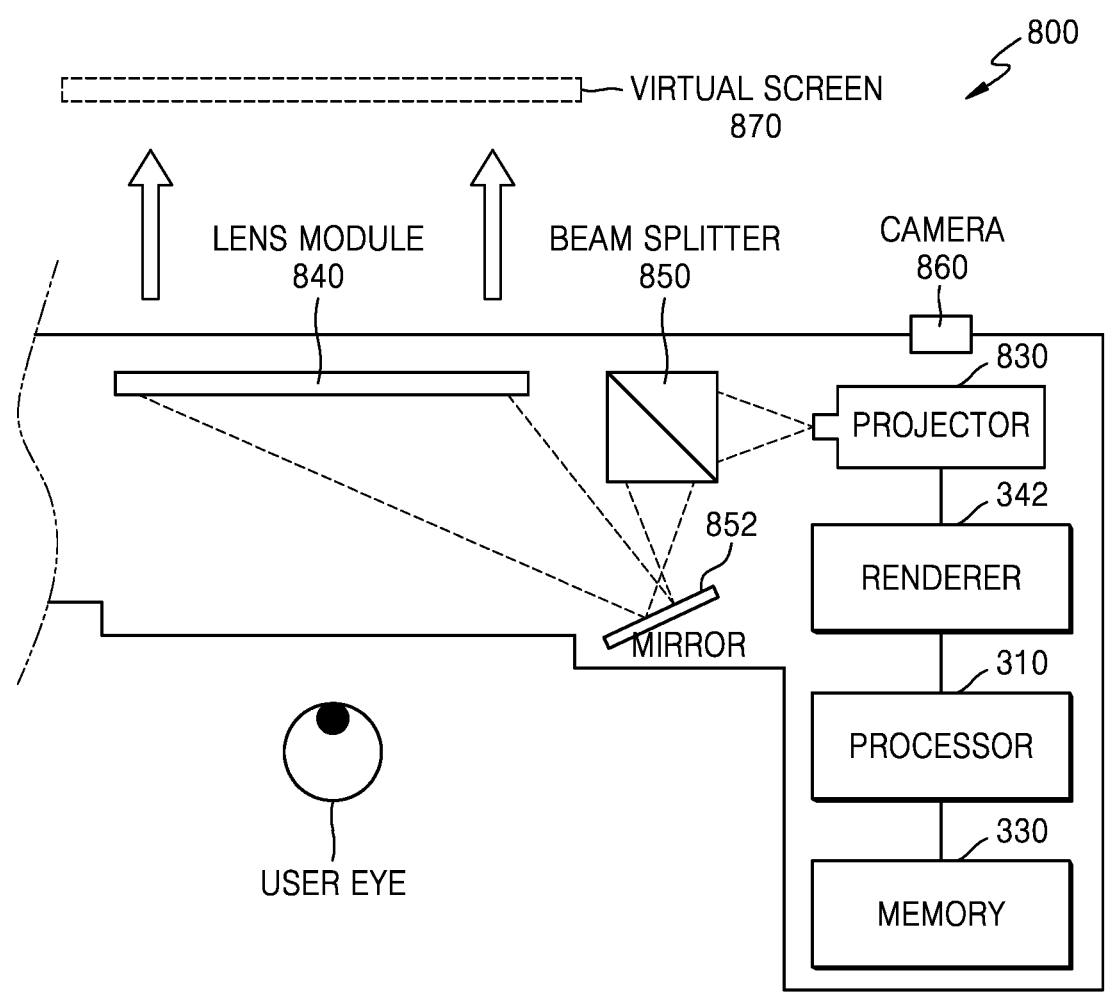
FIG. 8 is a cross-sectional view of an electronic device according to an example embodiment.

FIG. 8 is a cross-sectional view of an electronic device according to other example embodiments.

Referring to FIG. 8, an electronic device 800 may include a processor 310, a memory 330, a renderer 342, a projector 830, a lens module 840, a beam splitter 850, and a mirror 852, and a camera 860. In this case, the electronic device 800 may correspond to AR glasses including the electronic device 300 of FIG. 3. Thus, in the description of FIG. 8, descriptions that are substantially the same as those given above may be omitted for conciseness.

According to an example embodiment, the processor 310 may generate an output image (e.g., the second image 314 of FIG. 5) based on the pose variation calculated based on the data value of the lookup table received from the memory 330 and the image information obtained through the camera 860. In an example embodiment, the processor 310 may transmit data about the output image 314 to the projector 830. For example, the processor 310 may generate an output image 314 with image latency corrected for a predistorted input image (e.g., the first image 312 in FIG. 5) and transmit data about the output image 314 to the projector 830.

In an example embodiment, the projector 830 may emit light including the data about the output image 314 to the lens module 840. For example, the processor 310 may control the light including the data about the output image 314 to be emitted to the lens module 840 through the projector 830. In this case, the light emitted from the projector 830 may be reflected by the beam splitter 850 and the mirror 852 to reach the lens module 840.

In an example embodiment, as the user wears the electronic device 800, the lens module 840 may be located apart from the user's eyes by a certain distance (e.g., 5 cm). Also, the lens module 840 may provide a virtual screen 870 to the user as light including data about an output image is displayed. A normal image without distortion aberration may be displayed on the virtual screen 870 as distortion (e.g., pincushion distortion) to be generated according to the optical characteristics of the lens module 840 is corrected.

Figure 9A:
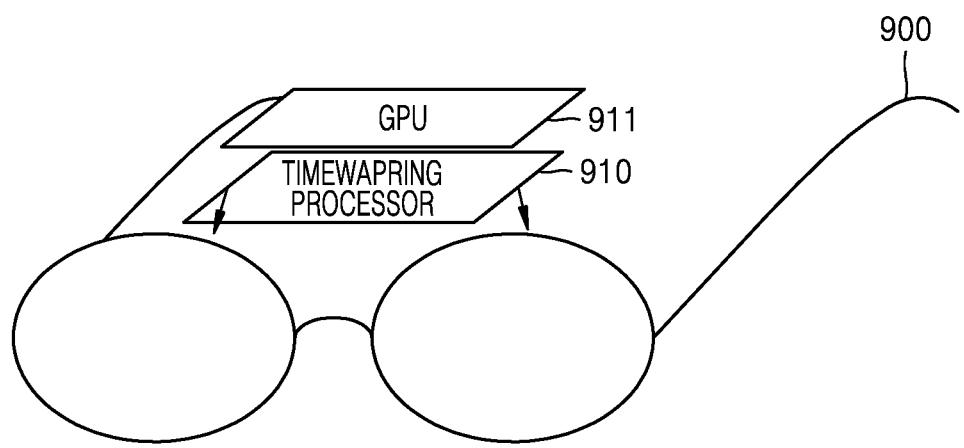
FIG. 9A is a diagram illustrating a connection method of an electronic device, according to an example embodiment.
Figure 9B:
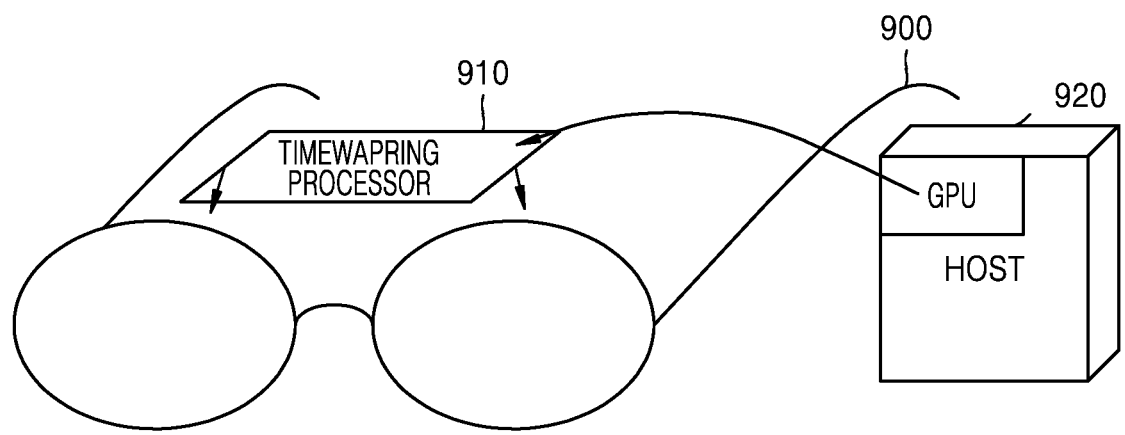
FIG. 9B is a diagram illustrating a connection method of an electronic device, according to other example embodiments.

FIG. 9A is a diagram illustrating a connection method of an electronic device, according to an example embodiment. FIG. 9B is a diagram illustrating a connection method of an electronic device, according to other example embodiments.

Referring to FIG. 9A, an electronic device (e.g., the electronic device 300 of FIG. 3) and a renderer (e.g., the renderer 342 of FIG. 5) may be integrally coupled with AR glasses 900. For example, the electronic device 300 and the renderer 342 may be attached to at least a partial region of the AR glasses 900 in the form of an electronic circuit or may be embedded in at least a partial region thereof. In an embodiment, the electronic device 300 may include a time-warping processor 910, and the renderer 342 may include a graphical processing unit (GPU) 911.

In an example embodiment, the renderer 342 may be connected to a processor of the AR glasses 900 at an electrically and/or physically close position to rapidly process graphics-related operations. The graphic-related operations may include per-pixel processing of an image obtained through the AR glasses 900, graphic processing related to the AR glasses 900 and/or the user's movement, or image processing according to direction and movement.

Referring to FIG. 9B, the electronic device 300 may be integrally coupled with the AR glasses 900, and the renderer 342 may be connected and communicate with the AR glasses 900 through a communication interface. For example, the renderer 342 may be mounted or embedded in a host 920 in a tethered manner to process graphic operations.

In an example embodiment, the renderer 342 may not be integrally coupled with the AR glasses 900 and may process graphics-related operations. For example, the renderer 342 may render an image received through the AR glasses 900 and transmit the rendering result thereof to the AR glasses 900. The renderer 342 may process a graphic operation by using a GPU (e.g., the GPU 911 of FIG. 9A), and the electronic device 300 that may be included in the AR glasses 900 may process time-warping through the time-warping processor 910.

The electronic devices and methods according to various embodiments may minimize image latency by performing time-warping by inputting an image predistorted at the time of rendering.

Also, the electronic devices and methods according to various embodiments may receive an image predistorted and reduced in data size from the renderer, thereby overcoming the reduction of the data transmission efficiency in the related art when a final output image is compared with an initial rendered image.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
a communication interface; and
a processor configured to: receive, from an external device through the communication interface, a first image predistorted and rendered at a first time, calculate a pixel shift for each pixel of the received first image at a second time different from the first time, generate a second image by reprojecting the first image based on the calculated pixel shift, and transmit the generated second image to the external device through the communication interface.

2. The electronic device of claim 1, further comprising a memory storing at least one lookup table,
wherein the processor is further configured to:
receive a data value of the lookup table from the memory,
receive image information about an outside environment from the external device and calculate a pose variation from the first time to the second time, and
calculate the pixel shift for the each pixel of the first image based on the data value of the lookup table and the pose variation.

3. The electronic device of claim 2,
wherein the memory stores, in the lookup table, a plurality of data values obtained by linearly approximating a pixel shift of the first image with respect to a pixel shift of an original image of the first image.

4. The electronic device of claim 2,
wherein the processor is further configured to:
obtain image data for each scan line with respect to the received first image,
receive the data value of the lookup table corresponding to the scan line from the memory, and
calculate a pixel shift in the scan line based on the data value of the lookup table corresponding to the scan line and the pose variation.

5. The electronic device of claim 1,
wherein the processor is further configured to:
receive a depth image corresponding to the first image from the external device, and
calculate the pixel shift for the each pixel of the first image based on the first image and the depth image.

6. The electronic device of claim 5,
wherein, when a plurality of depth values are detected in a pixel among a plurality of pixels of the second image, the processor is further configured to determine a smallest depth value among the plurality of depth values as a depth value of the pixel.

7. The electronic device of claim 1,
wherein the processor is further configured to:
receive a representative depth value of a representative image corresponding to the first image from the external device, and
calculate the pixel shift for the each pixel of the first image based on the first image and the representative depth value.

8. The electronic device of claim 1,
wherein, when a pixel value of a first pixel among a plurality of pixels of the second image is 0, the processor is configured to insert a pixel value of a second pixel arranged adjacent to the first pixel into the first pixel prior to transmission of the second image to the external device.

9. An operation method of an electronic device, the operation method comprising:

receiving a first image predistorted and rendered at a first time, from an external device;
calculating a pixel shift for each pixel of the received first image at a second time different from the first time;
generating a second image by reprojecting the first image based on the calculated pixel shift; and
transmitting the generated second image to the external device.

10. The operation method of claim 9, further comprising:
receiving a data value of a lookup table from a memory;
receiving image information about an outside environment from the external device and calculating a pose variation from the first time to the second time; and
calculating the pixel shift for the each pixel of the first image based on the data value of the lookup table and the pose variation.

11. The operation method of claim 10, further comprising:
obtaining image data for each scan line with respect to the received first image;
receiving the data value of the lookup table corresponding to the scan line from the memory; and
calculating a pixel shift in the scan line based on the data value of the lookup table corresponding to the scan line and the pose variation.

12. The operation method of claim 9, further comprising:
receiving a depth image corresponding to the first image from the external device; and
calculating the pixel shift for the each pixel of the first image based on the first image and the depth image.

13. The operation method of claim 12, further comprising, when a plurality of depth values are detected in a pixel among a plurality of pixels of the second image, determining a smallest depth value among the plurality of depth values as a depth value of the pixel.

14. The operation method of claim 9, further comprising:
receiving a representative depth value of a representative image corresponding to the first image from the external device; and
calculating the pixel shift for the each pixel of the first image based on the first image and the representative depth value.

15. The operation method of claim 9, further comprising, when a pixel value of a first pixel among a plurality of pixels of the second image is 0, inserting a pixel value of a second pixel arranged adjacent to the first pixel into the first pixel prior to transmission of the second image to the external device.

16. An electronic device comprising:
a renderer;
a projector configured to emit light including image data rendered through the renderer;
a lens module configured to display the light emitted from the projector; and
receives a first image predistorted and rendered at a first time, from the renderer,
a processor configured to: receive, from an external device, a first image predistorted and rendered at a first time, from the renderer, calculate a pixel shift for each pixel of the received first image at a second time different from the first time,
generate a second image by reprojecting the first image based on the calculated pixel shift, and
transmit data about the generated second image to the projector and control light including the data about the second image to be emitted to the lens module through the projector.

17. The electronic device of claim 16, further comprising:
a camera configured to obtain image information about an outside environment; and
a memory storing at least one lookup table,
wherein the processor is further configured to:
receive a data value of the lookup table from the memory,
receive the image information obtained through the camera and calculate a pose variation from the first time to the second time, and
calculate the pixel shift for the each pixel of the first image based on the data value of the lookup table and the pose variation.

18. The electronic device of claim 17,
wherein the memory stores, in the lookup table, a plurality of data values obtained by linearly approximating a pixel shift of the first image with respect to a pixel shift of an original image of the first image.

19. The electronic device of claim 16,
wherein the processor is further configured to:
receive a depth image corresponding to the first image from the renderer, and
calculate the pixel shift for the each pixel of the first image based on the first image and the depth image.

20. The electronic device of claim 16,
wherein the processor is further configured to:
receive a representative depth value of a representative image corresponding to the first image from the renderer, and
calculate the pixel shift for the each pixel of the first image based on the first image and the representative depth value.

* * * * *